April 5, 1960  R. OLDENBURGER ET AL  2,931,342
METHOD AND APPARATUS FOR HYDRAULIC CONTROL SYSTEMS
Filed Sept. 14, 1956  7 Sheets-Sheet 2

INVENTORS.
Rufus Oldenburger
George Forrest Drake
BY
Carlson, Pitzner, Hubbard & Wolfe
Attys.

April 5, 1960  R. OLDENBURGER ET AL  2,931,342
METHOD AND APPARATUS FOR HYDRAULIC CONTROL SYSTEMS
Filed Sept. 14, 1956  7 Sheets-Sheet 3

INVENTORS
Rufus Oldenburger
George Forrest Drake
BY
Carlson, Pitzner, Hubbard & Wolfe
Attys.

April 5, 1960    R. OLDENBURGER ET AL    2,931,342
METHOD AND APPARATUS FOR HYDRAULIC CONTROL SYSTEMS
Filed Sept. 14, 1956    7 Sheets-Sheet 6

Inventors.
Rufus Oldenburger
George Forrest Drake
By:
Carlson, Pitzner, Hubbard & Wolfe
Attys.

United States Patent Office 2,931,342
Patented Apr. 5, 1960

2,931,342

METHOD AND APPARATUS FOR HYDRAULIC CONTROL SYSTEMS

Rufus Oldenburger and George Forrest Drake, Rockford, Ill., assignors to Woodward Governor Company, Rockford, Ill., a corporation of Illinois Application September 14, 1956, Serial No. 609,944

21 Claims. (Cl. 121—41)

The present invention relates in general to methods and apparatus for automatically controlling or adjusting a variable condition, and in particular to hydraulic, non-linear controls for maintaining a variable condition at a reference value.

The term "control system" or "controller" as here employed refers to a device or mechanism which measures the value of a variable condition or quantity, and which operates to correct or limit deviation of this condition from a selected reference value called the "set point." Such devices are characterized by closed loop or feed-back means. Other terms of this art as used herein conform to the definitions set forth in paper No. 52–SA–29 published in 1952 by the American Society of Mechanical Engineers and entitled "Automatic Control Terminology."

The variable condition or quantity to be controlled may be any of a wide variety, for example, the position of a movable element; the angular speed of a rotating shaft; the pressure, rate of flow, or level of fluid; the temperature of a body or air mass; and others that will occur to those skilled in the art. In each automatic controller there is a "motor operator" to which energy is supplied to cause the corrective action. For example, in a temperature control system, electric current might be supplied to a resistance type heating element when the controlled temperature of a body drops below the set point. By way of further example, the load on a fuel-burning engine might be increased or decreased, as required, by supplying pressure fluid to a hydraulic ram connected to increase or decrease the load on the engine by changing the pitch of a propeller on the engine's output shaft, so that speed of the engine is maintained at the set point nothwithstanding changes in the throttle setting, fuel mixture, or other factors. In these examples, the resistance element and the hydraulic ram are "motor operators." In each case, the power or rate of energy acceptance for the motor operator is limited to some finite value either by the nature of the energy source or the rating of the motor operator.

The speed with which corrective action may take place is thus correspondingly limited. To pursue the foregoing examples, the resistance element of a temperature control system has a maximum current and power rating which, if exceeded, might result in its destruction; and the hydraulic ram for the engine control has a certain maximum rated pressure which, if exceeded, could rupture its cylinder. Maximum available voltage or pressure in the examples noted as thus always limited to prevent overloading of the motor element when wide deviations of the controlled condition occur.

It has been proposed that in order to minimize transient responses in control systems, i.e., to make the amplitude of any deviation and the time required to return the variable condition to the set point after some disturbance, the motor operator should be run at "full power" in one sense, and then switched to "full power" in the opposite sense to prevent overshoot, i.e., deviation in the opposite direction from the original deviation. When the deviation is reduced to a relatively small value, then the power or rate of energy supplied to the motor operator is gradually reduced to bring the variable condition into the control point without overshoot or cycling.

Such "full power" control and switching of the motor operator might be accomplished with "on-off" switching devices giving two-position action, e.g., electrical switches or hydraulic valves which are either fully open or fully closed. But such "on-off" control leads to disturbances at the "switch points" which leave transient responses something less than optimum. An improved and very advantageous method and sysem for automatic control has been disclosed and claimed in U.S. application Serial No. 384,957, filed October 8, 1953, in the name of Rufus Oldenburger, and assigned to the assignee of the present invention. In that improved system, no abrupt physical "switching" or "on-off" action is employed, but by apparatus providing a special non-linear control function, the motor operator is made to work at substantially full power when the deviation is large to produce an optimum, minimum transient response when deviations of the variable conditions occur.

It is the general aim of the present invention to provide a method and apparatus for a hydraulic control system which gives substantially optimum transient responses without overshoot or cycling when the controlled quantity for any reason deviates from the reference value. An important object of the invention is to provide such a method and apparatus for a hydraulic control system which works with a non-linear control function including a signed square of a deviation derivative to automatically cause the motor operator to work with "full power" when the deviation is large, and at less than full power when the deviation is small, thereby obtaining a smooth, fast return, without overshoot or hunting, of the controlled condition to the reference value when disturbances occur.

It is a further object to provide a new, simplified and convenient method and apparatus for obtaining a hydraulic signal, such as a fluid pressure variation, which changes in proportion to the time derivative of another variable signal or condition.

Another important object of the invention is to provide a method and apparatus for obtaining a hydraulic signal, such as fluid pressure variation, which changes in proportion to the "absquare" of another variable signal. The term "absquare" as used herein refers to the signed square of a quantity. Whereas the square of a number, $x$, is positive whether $x$ itself is either positive or negative, the "absquare" of a number such as $x$ is equal to the absolute value of $x^2$ with the sign of the number. In other words, the absquare of $x$ is equal to $+|x^2|$ if $x$ is positive and is equal to $-|x^2|$ if $x$ is negative. For convenient notation, the absquare of a number is symbolically represented by enclosing that number in wavy brackets, i.e., the absquare of a quantity "$x$" is designated by the symbol $\{x\}$.

It is still another object of the invention to provide a method and apparatus for multiple automatic control action with a hydraulic system which provides corrective action on the basis of the instantaneous amount of the deviation (proportional action), the first or higher order rates of change of the deviation (derivative action), and the absquare of the first or higher order rates of change of the deviation (non-linear action).

An additional object is to provide a hydraulic control system which, though not limited in its application, is especially useful as a governor for controlling the pitch of an airplane propeller and thus controlling the speed of an associated aircraft engine.

Other objects and advantages will become apparent as the following description proceeds, taken in conjunction with accompanying drawings, in which.

While the invention has been shown and will be described in some detail with reference to particular embodiments thereof, there is no intention that it thus be limited to such details. On the contrary, it is intended here to cover all modifications, alterations and equivalents falling within the spirit and scope of the invention as defined by the appended claims.

Figure 1:
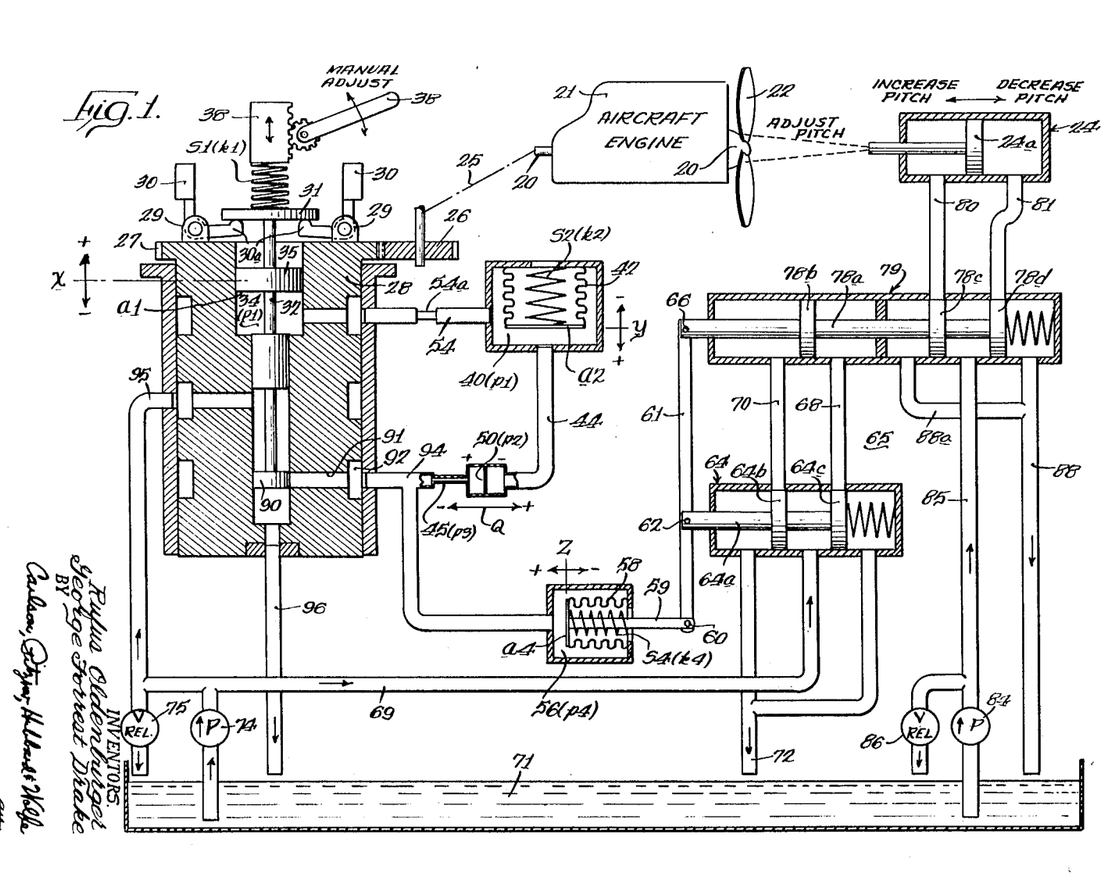
Figure 1 is a schematic diagram of a hydraulic control system embodying the features of the invention.

Referring now to Fig. 1, the invention has been there exemplified as embodied in an aircraft engine governor system, specifically a system for maintaining the speed of the output shaft 20 for an engine 21 at a constant reference value by adjusting the pitch of the blades for a variable pitch propeller 22. The angular position of the propeller blades is susceptible of adjustment by a double-acting hydraulic ram 24, which in actual practice may be located within the propeller hub as disclosed, for example, in U.S. Patent 2,527,867. While the invention has been illustrated as embodied in a speed governing controller for an aircraft engine, it is to be understood that it is nevertheless advantageously applicable to the control of any other variable condition or quantity.

In the illustrated system, the variable condition that is to be maintained at a reference value is the speed of the engine shaft 20. That speed might tend to change from a selected value by virtue of changes in air density, changes in the fuel mixture supplied to the engine, changes in the throttle setting, and a variety of other factors. By changing the pitch of the propeller blades, the load on the engine may be either increased or decreased, and thus its speed correspondingly decreased or increased until it is held at the desired reference value.

As a first step toward the automatic control of the speed of the shaft 20, that speed, or variable condition is sensed or measured, and a hydraulic pressure variation from a reference pressure is created which is proportional to deviations of the shaft speed from the reference value. For this purpose, a driving connection 25 is made from the shaft 20 to a gear 26 mesh with a mating gear 27 on a rotatable hydraulic casing 28. Pivoted at 29 on the casing 28 are flyballs 30 having inwardly extending arms 30a engaged beneath a flange 31 on a plunger 32 vertically slidable within the casing 28. The plunger 32 is biased downwardly by a spring S1 (having a spring constant or modulus $k_1$) while a suitable hydraulic fluid such as oil is present in a chamber 34 defined within the casing 28 beneath a land 35 on the plunger.

As the speed of the engine either increases or decreases from the reference value, the centrifugal force on the flyweights 30 increases or decreases proportionally, and this tends to raise or lower the plunger 32 against the downward bias of the spring S1, by an amount proportional to the change in speed. The pressure of the fluid in the chamber 34 beneath the land 35 is, therefore, decreased or increased from an initial or reference pressure value in proportion to deviations in the speed of the shaft 20.

The reference value of the speed which is to be automatically maintained may be adjusted by changing the downward bias on the plunger 32 and thus the steady state value of the fluid pressure within the chamber 34. For this purpose, a manual adjustment knob 38 is connected by suitable gearing to vertically position a member 39 against which the upper end of the spring S1 bears. If it is desired to decrease the reference value of the engine speed, the member 39 is raised so that the original biasing force of the spring S1 is decreased, the reference pressure within the chamber 34 decreased. On the other hand, if it is desired to increase the reference value of the engine speed, then the member 39 is lowered to increase the bias of the spring S1 and thus increase the reference value of pressure within the chamber 34.

As a second step in carrying out the present invention, a hydraulic signal variation, in this instance a hydraulic pressure variation, is created which is proportional to the time derivative or rate of change of the speed deviations of the shaft 20 from the reference value. To do this, the volume of fluid contained within a chamber is increased or decreased in proportion to deviations of the speed or variable condition, and such changes in volume consumated by causing fluid to flow into or out of the chamber through an orifice which has a linear relation between the rate of flow of fluid therethrough and the pressure drop thereacross.

In this fashion, the pressure drop across that orifice is caused to vary as the time derivative of the deviations in the variable condition, since the rate of flow into or out of the chamber is proportional to the time derivative of the deviations.

Figure 2:
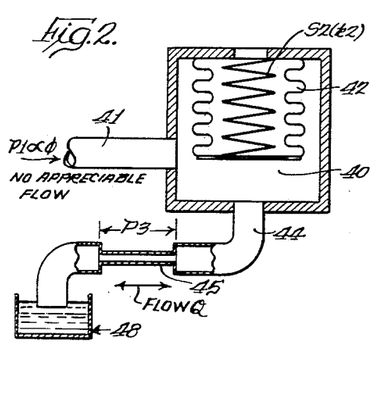
Fig. 2 is a schematic representation of means for obtaining a varying signal proportional to the time derivative or rate of change of another varying signal.

Means for accomplishing this are schematically illustrated in Fig. 2. As there shown, a fluid pressure chamber 40 communicates through a conduit 41 with some means for changing the pressure within the chamber 40 in proportion to deviations of the variable condition, e.g., the speed of the shaft 20. For example, the conduit 41 might be in communication with the chamber 34 in Fig. 1, so that the pressure within the chamber 40 would also vary in proportion to deviations of the speed of the shaft 20.

To increase or decrease the volume of fluid contained within the chamber 40 in proportion to increases or decreases in the pressure of fluid therein, a resilient, expansible bellows 42 is mounted within the chamber to form one wall portion thereof, and is biased inwardly by a suitable compression spring S2 having a spring constant $k_2$. Since as the pressure of fluid within the chamber 40 increases and decreases, the spring S2 and the bellows 42 contract and expand a proportional amount, the volume of the chamber 40 is changed in proportion to the changes of pressure. Assuming for the moment that as the bellows 42 expand or contract from an original or reference position, no fluid flows through the conduit 41 (and the propriety of this assumption will be explained below), then fluid must flow into or out of the chamber 40 through a conduit 44 which contains an orifice portion 45 having a linear relation between the pressure drop thereacross and the rate of fluid flow therethrough.

Figures 4, 5, 6:
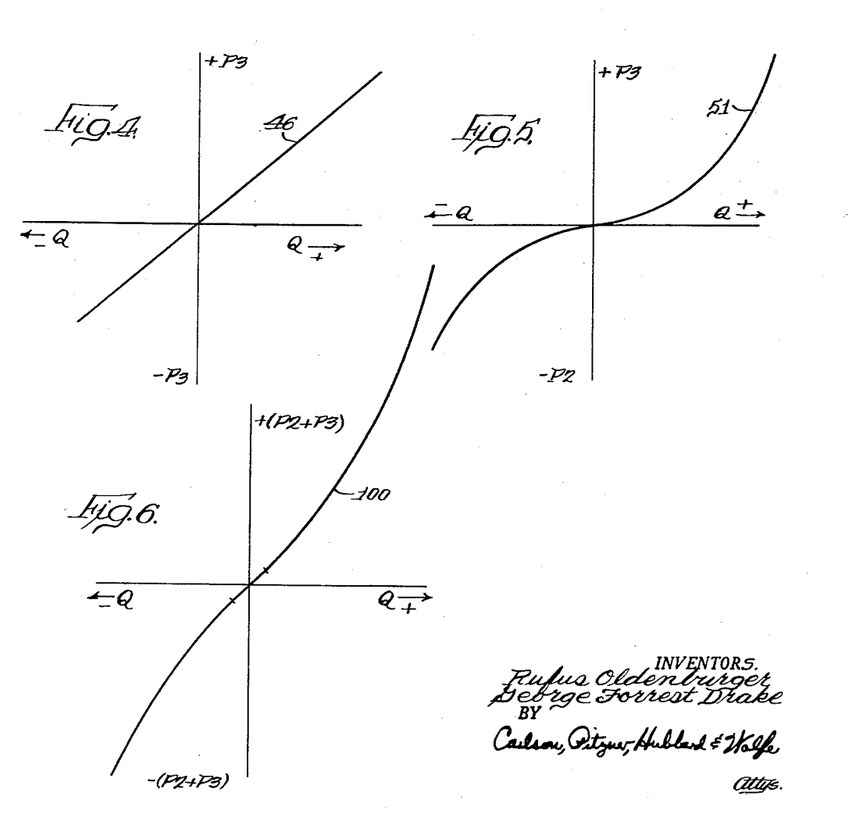
Figs. 4, 5 and 6 are graphs illustrating the pressure drop versus flow characteristics for the orifice means shown in Figs. 1, 2 and 3.

For example, the orifice 45 may be a cylindrical, pipe-like orifice of relatively small diameter as compared to its length which is known to have the pressure versus flow characteristic illustrated in Fig. 4. As shown by the line 46 in Fig. 4, if the flow Q in volume per unit time through the orifice 45 increases from zero in either direction through the orifice, then the pressure drop across that orifice correspondingly increases in proportion and in the same direction. The line 46 may be mathematically defined by the equation $p_3 = c_3 Q$ where $p_3$ is the pressure drop across the orifice 45, Q is the flow therethrough, and $c_3$ is a constant.

Therefore, as the bellows 42 (Fig. 2) expands and contracts within the chamber 40, and changes in the volume of that chamber are consumated by fluid flow through the orifice 45 into or out of a receiving receptacle 48, the pressure drop $p_3$ across the orifice 45 will agree in sense with the direction of fluid flow therethrough, and will be proportional in magnitude to the rate of fluid flow. However, the rate of fluid flow Q depends upon the rate of change of the volume within the chamber 40 and this in turn depends upon the rate of expansion or contraction of the bellows 42 which is, in turn, dependent upon the rate of change of pressure within the chamber 40. Thus it may be seen that the pressure drop $p_3$ across the orifice 45 is by this arrangement made to vary in proportion with the rate of change of the deviation of the variable condition since the fluid flow through that orifice is directly proportional to the rate of change of pressure within the chamber 40, while the pressure itself within the chamber is made directly proportional to the deviation.

It may be observed here that the orifice 45 may have any of a variety of configurations as long as the pressure drop thereacross is proportional to the rate of fluid flow therethrough. In other words, the pressure versus flow characteristic of the orifice 45 should substantially agree with the mathematical expression $p_3 = c_3 Q$, given above. For a cylindrical, pipe-like orifice, the constant $c_3$ is directly proportional to the length of the orifice and inversely proportional to the fourth power of the diameter. Thus it is possible by choosing orifices of different lengths or diameters to obtain a desired value of the constant $c_3$, and thus to obtain flow characteristics such as illustrated at 46 in Fig. 4 which have different slopes.

As a next step in carrying out the invention, a hydraulic signal, here a fluid pressure variation, is created which changes non-linearly, but agrees in sense, with the rate of change of the deviation of the variable condition. Preferably, the hydraulic signal is made to vary as the absquare of the time derivative of the deviation. To bring this about, a fluid pressure variation proportional to the deviation is obtained, for example, by means such as the flyweights 30 and plunger 32 as previously described in connection with Fig. 1. That pressure which is proportional to deviation, is caused to change the volume of a fluid chamber in direct proportion, and flow into or out of the chamber is consumated by causing it to pass through an orifice which has a signed nonlinear, specifically an absquare, characteristic relating the pressure drop thereacross to the flow therethrough.

Figure 3:
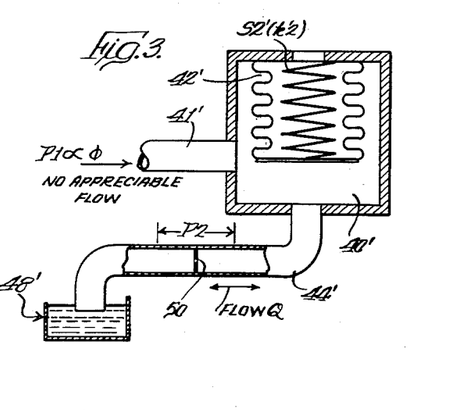
Fig. 3 is a schematic representation of means for obtaining a hydraulic signal or variation proportional to the absquare of the time derivative of a varying condition.

Means for accomplishing this are schematically illustrated in Fig. 3 where a fluid pressure chamber 40' is illustrated as communicating through a large conduit 41' with some fluid body which has the pressure therein changed in proportion to deviations of the variable condition. For example, the conduit 41' may connect directly to the chamber 34 illustrated in Fig. 1. Forming a part of the chamber 40' is a resilient, compressible bellows 42' which is biased to an expanded condition by a compression spring S2' having a spring constant $k'_2$. Thus, as the pressure within the chamber 40' increases or decreases, the bellows 42' contracts or expands proportionally, and correspondingly changes the volume of fluid contained within the chamber.

Such changes in volume necessarily produce fluid flow into and out of the chamber, and the rate of fluid flow, Q is proportional to the rate of change of volume, or is proportional to the rate of change of pressure within the chamber 40'. That fluid flow is caused to pass through a conduit 44' which contains an orifice 50 having the characteristic that the pressure drop thereacross varies as the signed square or "absquare" of the rate of fluid flow therethrough. Thus, as the volume of fluid within the chamber 40' increases or decreases and fluid flows through the orifice 50 between the chamber 40' and a fluid receptacle 48', the pressure drop across the orifice 50 varies directly as the absquare of the time derivative of the deviation of the variable condition.

The orifice 50 is one which has a pressure drop versus flow characteristic such as illustrated by the curve 51 in Fig. 5. It is known, for example, that a circular orifice in a very thin plate, termed by those skilled in the art a "sharp-edged" orifice, has the pressure drop thereacross vary as the square of the rate of fluid flow therethrough. However, as the direction of fluid flow changes, the direction or sense of the pressure drop also changes as shown in Fig. 5 so that the pressure drop does not vary truly as the square of the rate of flow Q, but rather varies as the signed square or absquare of the rate of flow. Thus, the flow characteristic for the orifice 50, which as illustrated in Fig. 3 is a sharp-edged orifice, may be expressed $p_2 = c_2 \{Q\}$ where $p_2$ is the pressure drop across the orifice, $\{Q\}$ is the absquare of the rate of flow therethrough, and $c_2$ is a constant. The constant $c_2$ is inversely proportional to the fourth power of the diameter of the sharp-edged orifice 50, and thus the value of the constant $c_2$ may be adjusted as desired simply by making the orifice 50 of different diameters.

It will be seen from the foregoing that the means shown in Fig. 2 serve to create a hydraulic pressure drop $p_3$ which varies in direct proportion to the first time derivative of a variable condition. The means shown in Fig. 3 operate to produce a pressure drop $p_2$ which varies as the absquare of the time derivative of a variable condition. The manner in which the arrangements shown in Figs. 2 and 3 are utilized in the control system may now be described with reference to Fig. 1.

As previously noted, the fluid pressure within the chamber 34 is caused to vary from a first reference pressure value in direct proportion with deviations of the speed of the shaft 20 from a reference speed. The chamber 34 is directly connected by means of a conduit 54 to a chamber 40 which is substantially identical with the chambers shown in Figs. 2 and 3. The conduit 54 contains a restriction 54a but this is provided only to create damping action and does not significantly affect the equality of the pressures within the chambers 34 and 40. Thus, it will be seen that the pressure within the chamber 40 varies in direct proportion to deviations of the speed of the shaft 20 from a reference value.

The conduit 44 leading from the chamber 40 has connected in series therewith an orifice 45 which, as explained in connection with Fig. 2, has a linear relation between the rate of fluid flow therethrough and the pressure drop thereacross. In series with the orifice 45 is a second orifice 50 which, as previously explained, has an absquare relation between the pressure drop thereacross and the rate of fluid flow therethrough.

In further carrying out the invention, a hydraulic signal or fluid pressure variation is created which varies as the sum of the pressure in the chamber 40, the pressure drop across the orifice 45, and the pressure drop across the orifice 50. This, then, gives a fluid pressure variation which varies as the sum of a first pressure variation proportional to deviation, a second pressure variation proportional to the rate of change of the deviation, and a third pressure variation proportional to the absquare of the rate of change of the deviation.

To bring this about, a third fluid chamber 56 is connected to communicate with the chamber 40 through the orifices 45 and 50. Thus, the fluid pressure within the chamber 56 changes from a reference pressure level in proportion to the sum of the pressure changes across the orifice 45, across the orifice 50, and in the chamber 40. The pressure variation in the chamber 56 thus changes from a reference level according to a special function of the deviations of the shaft 20 from a reference speed.

To complete the control, energy is supplied to the motor operator or ram 24 at a rate which is proportional to the pressure changes within the chamber 56.

For this purpose, a resilient contractable bellows 58 is mounted within the chamber 56 to form a part of the boundary wall thereof, that bellows being biased in an expanded direction by a suitable compression spring S4 having a spring constant $k_4$. A link 59 connected to the inner end of the bellows 58 is thus moved back and forth from a reference position in proportion to pressure variations from the reference level within the chamber 56. The link 59 is pivotally connected as at 60 to a floating lever 61, the latter also being pivoted at 62 to a hydraulic relay valve 64 forming a part of an hydraulic amplifier 65. The hydraulic amplifier 65 is simply a device which causes displacements of the piston 24a of the double-acting ram 24 at a rate and in a direction corresponding to displacements of the link 59. It will be seen that as the link 59 shifts to the right or to the left, it causes the floating lever 61 to pivot about an upper pivot point 66 and thus shift the plunger 64a of the relay valve 64 to the right or to the left. Accordingly, the lands 64b and 64c carried by the plunger 64a are made to connect a conduit 68 with a source of pressure fluid existing in a conduit 69; and to connect a conduit 70 to a fluid sump 71 through a conduit 72. Alternatively, if the valve plunger 64a is shifted to the left as viewed in Fig. 1, then the conduit 68 will be connected through the conduit 72 to the sump 71, while the conduit 70 will be connected to the source of fluid pressure existing in the conduit 69. It may be seen from Fig. 1 that fluid pressure is created in the conduit 69 by a first pump 74 having its intake communicating with fluid in the sump 71, and having a relief valve 75 in parallel therewith so as to maintain a substantially constant pressure output.

As pressure fluid is supplied through the conduit 68, and vented through the conduit 70, or alternatively supplied through the conduit 70 and vented through the conduit 68, it acts on a land 78b for a plunger 78a slidable within a casing and forming an amplifying valve 79. The plunger 78a is thus shifted to the left or to the right in proportion with the displacement of the plunger 64a from its neutral position. It will be observed that the plunger 78a is pivotally connected at 66 to the floating lever 61 so that as the plunger 78 moves, it causes the lever 61 to pivot about its lower connection at 60, thereby restoring the valve plunger 64a to its neutral position in which the lands 64b, 64c block the conduits 70, 68.

As the plunger 78a is moved to the left or to the right from the neutral position shown, the lands 78c and 78d thereon are caused to uncover ports connecting with conduits 80 and 81. If the plunger 78a is moved to the left, then the conduit 80 will be placed in communication with a source of pressure fluid here illustrated as a second, higher pressure pump 84 supplying fluid into a conduit 85. The pump 84 may be paralleled with a relief valve 86 so that its pressure output is maintained substantially uniform. Also, when the plunger 78a is shifted to the left, the conduit 81 is placed in communication with the sump 71 through the conduit 88. Thus, under these conditions, the piston 24a of the hydraulic ram 24 will be caused to move to the right as viewed in Fig. 1, and this in turn will result in a reduction of the pitch of the blades for the propeller 22.

On the other hand, if the plunger 78a is shifted to the right as viewed in Fig. 1, the conduit 80 will be placed in communication with the sump 71 through the conduits 88a, 88, while the conduit 81 will be connected to communicate with the conduit 85 and the fluid pressure source provided by the pump 84. Under these conditions, therefore, the piston 24a within the hydraulic ram 24 will move to the left as viewed in Fig. 1 and will thus cause the pitch of the blades for the propeller 22 to be increased.

Decreasing or increasing pitch of the propeller blades correspondingly decreases or increases the load on the engine 21, and thus causes the latter to increase or decrease its speed. If some disturbance has caused the speed of the shaft 20 for the engine 21 to increase above the selected reference value, then the action of the controlling system here shown will result in the pitch of the propeller blades being increased so that the load on the engine is increased and its speed decreased until it is returned to the reference value. It may be observed that the hydraulic amplifier 65 energizes the motor operator or hydraulic ram 24 in a direction and at a rate proportional to the direction and rate of movement of the link 59. The movement of the link 59 from a reference position is, as stated, directly proportional to variations of pressure within the chamber 56 from a reference value. Thus, it may be considered that the blades of the propeller 22 are adjusted in their angle or pitch at a rate directly proportional to the changes of pressure within the chamber 56.

It has been previously mentioned that flow into or out of the chamber 40 passes through the orifices 50 and 45. To make the displacement of the bellows 58 and the link 59 dependent substantially only upon the sum of the three pressures noted above, the spring S4 is selected to have a relatively high spring constant $k_4$. Thus, the displacement of the link 59 is so small that flow into and out of the chamber 56 as a result of contraction and expansion of the bellows 58 is negligible. In order to permit fluid flow through the orifices 45 and 50 as the bellows 42 expand and contract, and in order to change the amount of fluid within the control system as the manual adjustment knob 38 is turned, the plunger 32 is provided with a valve land 90 slidable within a cylindrical passage of the casing 28. The land 90 normally covers a port 91 leading through the casing 28 to an annular passage 92 connected by means of a slidable ring to a conduit 94. The latter conduit leads through the orifices 45 and 50 to the chamber 40, so that as fluid flows into and out of the chamber, when the plunger 32 is deflected upwardly or downwardly from a reference position, it is supplied from the pump 74 through a conduit 95, or is vented through the conduit 91 to the sump 71 via the conduit 96. In this manner, fluid flow through the orifices 45 and 50, when deviations in speed occur, is accomplished without an appreciable amount of fluid flow into or out of the chamber 56, so that the pressure within the latter chamber and the displacement of the link 59 are both proportional only to the sum of the pressure in the chamber 40, and the pressure drops across the orifices 45 and 50.

It may be observed at this point that the flow through the orifices 45 and 50 must at all times be identical. This is true because they are connected directly in series. The sum of the pressure drops across the orifices 45 and 50 has a unique characteristic illustrated by the curve 100 in Fig. 6. It will be seen that the sum of these pressure drops, i.e., $p_2+p_3$, varies substantially linearly with the flow through the orifices in the region of the origin, i.e., for relatively low rates of flow which will be produced when deviations of the variable condition are changing at relatively low rates. On the other hand, in regions displaced considerably from the origin in Fig. 6, the sum of the pressure drops $p_2+p_3$ becomes quite non-linear with relation to the variations of flow, indicating that as the rates of change of deviation of the speed of the shaft 20 (Fig. 1) from the reference value are relatively high, then a disproportionately higher pressure drop occurs across the orifices 45 and 50. In one sense, it may be said that the linear characteristic 46 of the orifice 45 predominates in the region of the origin for the curve 100 in Fig. 6, while the non-linear or absquare characteristic 51 of the orifice 50 predominates when the rates of flow Q are relatively high.

With the method steps and apparatus of the present invention described with reference to Figs. 1–6, it will be helpful at this point to present a mathematical analysis of the present control system, since it will then become more clear as to how and why the system works to produce an optimum transient response.

Consider first the summation of vertical forces on the plunger 32 in Fig. 1. The force equation may be written:

$$k_1 x = p_1 a_1 + k_g \phi \qquad (1)$$

where:
$k_1$ = the modulus of the spring S1
$x$ = the displacement (positive up) of the plunger 32 from a reference position
$p_1$ = the pressure change from a reference value within the chamber 34 and beneath the land 35
$a_1$ = the effective area on the underside of the land 35
$k_g$ = the proportionality constant relating speed and force for the flyweights 30
$\phi$ = the deviation of the speed of the shaft 20 from a selected reference value.

In the present instance, the area of $a_1$ is made relatively small in proportion to the effective area $a_2$ at the free end of the bellows 42.

Therefore, as speed deviations occur, the movement of the plunger 32 does not appreciably affect the volume in the chamber 40, but in effect, only causes changes of pressure within the chamber 34. Moreover, because the area $a_1$ is small as compared to the area $a_2$ and because a negligible amount of fluid flows into or out of the chamber 34, the displacement $x$ of the plunger 32 as speed deviations occur is so small that it may be neglected and considered zero. Therefore, disregarding the quantity $k_1 x$ in Equation 1 and solving for $p_1$, the following equation may be written:

$$p_1 = \frac{-k_g}{a_1} \phi \qquad (2)$$

Next, consider the equilibrium force equation for the bellows 42 in the chamber 40. The pressure within the chamber 40 will be the same as the pressure within chamber 34, i.e., $p_1$, and if it is assumed that the displacement of the lower end of the bellows 42 is positive in a downward direction, the following equation may be written:

$$-k_2 y = p_1 a_2 \qquad (3)$$

where:
$k_2$ = the spring constant or modulus for the spring S2,
$y$ = the displacement (positive down) of the bellows 42 from a reference position,
$a_2$ = the area of the free end of the bellows 42.

Substituting $p_1$ from Equation 2 in Equation 3 and solving for $y$:

$$y = \frac{-a_2}{k_2} p_1 = \frac{a_2 k_g}{k_2 a_1} \phi \qquad (4)$$

Differentiating both sides of Equation 4:

$$\frac{dy}{dt} = y' = \frac{a_2 k_g}{k_2 a_1} \phi' \qquad (5)$$

As the bellows 42 expands and contracts from its reference position, i.e., as the variable $y$ increases positively or negatively, fluid flows out of or into the chamber 40 through the orifices 45, 50. If the rate of fluid flow, i.e., volume per unit time, is designated by the symbol Q, then it may be seen that the flow is proportional to the rate at which the bellows 42 is compressed or expanded, i.e., to the rate of change of $y$. Assuming that fluid flow in a direction into the chamber 40 to be positive, the following equation may be written:

$$Q = -a_2 y' \qquad (6)$$

Substituting the value of $y'$ from Equation 5 in Equation 6:

$$Q = -\frac{a_2^2 k_g}{k_2 a_1} \phi' \qquad (7)$$

It will be recalled that the pressure drop across the orifice 50 varies directly with the absquare of the rate of flow through the orifice. Since the area $a_1$ is small compared to the area $a_2$, flow into or out of chamber 40 does not result from passage of fluid through the conduit 54, but results substantially solely from fluid flow through the orifices 45 and 50. Therefore, the equation for the pressure drop across the orifice 50 may be written:

$$p_2 = c_2 \{Q\} \qquad (8)$$

where:
$p_2$ = the pressure drop across the orifices 50,
$Q$ = the rate of flow through the orifice,
$c_2$ = a proportionality constant which is related to the diameter of the orifice 50.

Substituting the value of Q from Equation 7 in Equation 8:

$$p_2 = -\frac{c_2 a_2^4 k_g^2}{k_2^2 a_1^2} \{\phi'\} \qquad (9)$$

where the constants appearing in Equation 7 may be squared and placed outside the absquare brackets since they are always positive.

In like manner, the equation for the pressure drop $p_3$ across the orifice 45 may be written:

$$p_3 = c_3 Q \qquad (10)$$

and substituting the value of Q from Equation 7 into Equation 10:

$$p_3 = -\frac{c_3 a_2^2 k_g}{k_2 a_1} \phi' \qquad (11)$$

Summing the forces on the bellows 58 within the chamber 56, the following force equation may be written:

$$-k_4 Z = p_4 a_4 \qquad (12)$$

where:
$k_4$ = the modulus or constant of the spring S4,
$Z$ = the displacement (positive to the left) of the end of the bellows 58 from a reference position,
$p_4$ = the pressure change from a reference value within the chamber 56,
$a_4$ = the area of the free end of the bellows 58.

Solving Equation 12 for $p_4$:

$$p_4 = \frac{-k_4 Z}{a_4} \qquad (13)$$

It will be seen that at any instant the pressure $p_4$ in the chamber 56 must be equal to the sum of the pressure drop across the orifice 45, the pressure drop across the orifice 50, and the pressure existing in the chamber 40 since the chamber 56 is connected to communicate with chamber 40 through the two orifices. Putting this in mathematical terms:

$$p_4 = p_1 + p_3 + p_2 \quad (14)$$

Substituting $p_4$ from Equation 13, $p_1$ from Equation 2, $p_3$ from Equation 11, and $p_2$ from Equation 9, Equation 14 may be rewritten:

$$-\frac{k_4 Z}{a_4} = -\frac{k_g}{a_1}\phi - \frac{c_3 a_2^2 k_g}{k_2 a_1}\phi' - \frac{c_2 a_2^4 k_g^2}{k_2^2 a_1^2}\{\phi'\} \quad (15)$$

Solving Equation 15 for $Z$:

$$Z = \frac{k_g a_4}{k_4 a_1}\phi + \frac{c_3 a_2^2 a_4 k_g}{k_2 a_1 a_4}\phi' + \frac{c_2 a_2^4 a_4 k_g^2}{k_2^2 k_4 a_1^2}\{\phi'\} \quad (16)$$

which has the general form:

$$Z = L\phi + M\phi' + N\{\phi'\} \quad (17)$$

where $L$, $M$, and $N$ are composite constants made up of the various constants as shown in Equation 16.

The constant $L$ is the constant of proportional action, the constant $M$ is the constant of rate action, and the constant $N$ is a constant for the non-linear rate action. The specific values of these three constants may be adjusted as desired in any given system to match the lags and gains within the system. The constant $L$ may easily be adjusted by changing the spring S4 so that it has a larger or smaller constant $k_4$. The constant $M$ may conveniently be adjusted to any desired value by changing the length or diameter of the orifice 45, that is, changing the value of the constant $c_3$. Similarly, the composite constant $N$ may be adjusted by changing the diameter of the sharp-edged orifice 50, thus changing the value of the constant $c_2$.

It will be recalled that the variable $Z$ as expressed in Equation 17 represents the displacement of the bellows 58 and thus the link 59 in Fig. 1 from a reference position which they will have when the speed of the shaft 20 is at the reference value. Thus, the valve plunger 64a (Fig. 1) will be shifted by an amount in a direction proportional to $Z$ so that the valve plunger 78a will be shifted by an amount proportional to $Z$. Therefore, the degree to which the ports connected from the valve 79 to the double-acting ram 24 are opened or closed, will be proportional to $Z$. The rate of energy supplied to the motor operator or ram 24, and the speed with which it moves in adjusting the pitch on the blades for the propeller 22, is thus proportional to the quantity $Z$.

In order to understand the advantages of the control function as represented by Equation 17, it will be helpful to rewrite that equation, by factoring:

$$Z = L\phi + (M + N|\phi'|)\phi' \quad (18)$$

Equation 18 shows that under all conditions there is some proportional action of the controller. That is, the term $L\phi$ in Equation 18 is a proportional term. However, in the second term $(M+N|\phi'|)\phi'$ the quantity in parenthesis may be considered as the coefficient for the rate or first derivative action of the control system. When the rate of change of speed deviation is relatively high, that coefficient will have a high value due to the presence of the term $N|\phi'|$. Thus, there will be a strong rate or first derivative action under those circumstances. On the other hand, when the rate of change of the deviation is relatively small, then the coefficient $(M+N|\phi'|)$ will be relatively small, having substantially only the value of the constant $M$. Under those circumstances the action of the control system will be substantially like that of a proportional system so that there will be little tendency for the system to cycle or overshoot.

Figure 7:
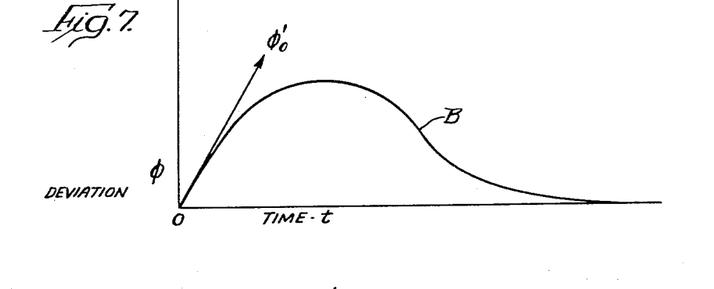
Fig. 7 is a graphic illustration of the transient response or variation of deviation with time produced by the present control system.

The graph in Fig. 7 illustrates the deviation $\phi$ of the variable condition with time whenever an abrupt disturbance occurs. If at the time instant when $t=0$ some abrupt disturbance occurs, for example, the propeller 22 entering an air pocket of considerably reduced density so that the engine tends to speed up, then the deviation $\phi$ will start to increase positively at a relatively high rate denoted by the slope of the arrow $\phi'_0$ in Fig. 7. Almost immediately with the present control system, the motor operator 24 is supplied with substantially full power to increase the pitch of the propeller blades. The blades may actually be increased in pitch beyond that position necessary to hold the speed of the engine at the reference value in the reduced density atmosphere. Then, at a point marked B in Fig. 12, the motor operator 24 will be supplied with substantially full power in the opposite direction to correctively decrease the pitch of the propeller blades. This may decrease the pitch beyond the point necessary to hold the speed of the engine at the desired reference level. Finally, however, the control function illustrated by Equation 18 becomes substantially linear as the deviation approaches zero, so that the propeller pitch is linearly adjusted until speed deviation is zero.

This arrangement, therefore, is one which minimizes the time of any transient produced by an abrupt change, and at the same time, minimizes the chances of overswing or underswing or cycling about the control point. The control function as represented by the Equation 17 or 18 is one which is non-linear from maximum control action when the deviation is relatively large, thereby minimizing the time of transient responses, while being substantially linear and proportional when the deviation is fairly small, thus reducing the possibility of overswing or cycling.

Figure 8:
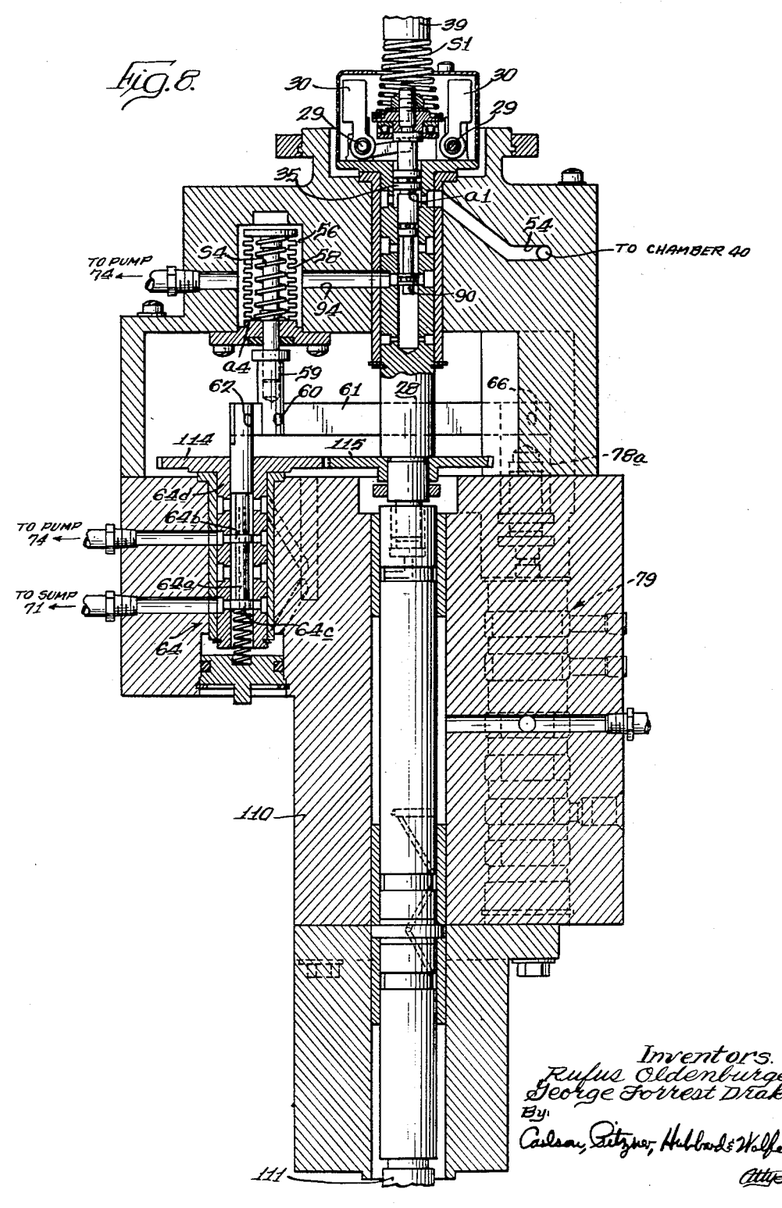
Fig. 8 is an elevational view, partially in section, taken along the line 8—8 in Fig. 9 of a controller mechanism corresponding to a part of that apparatus schematically illustrated in Fig. 1.
Figure 9:
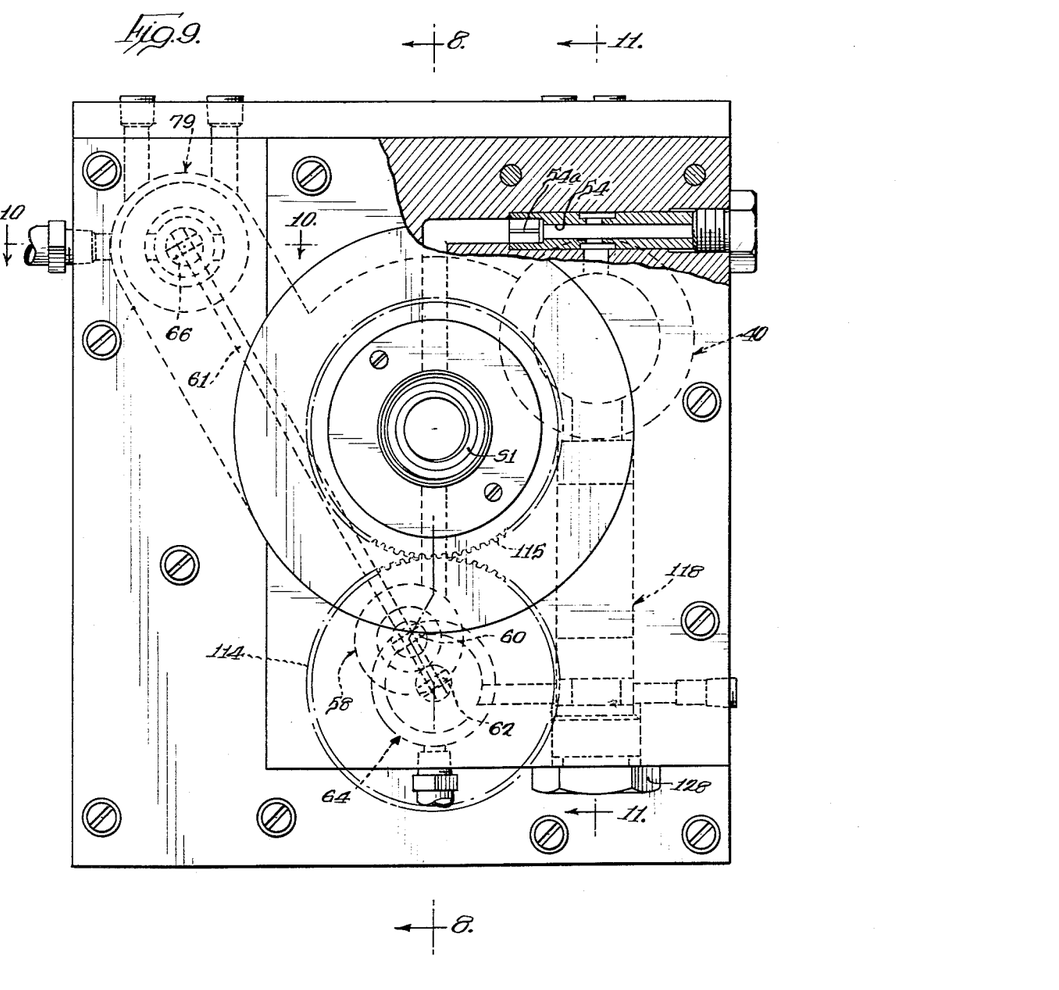
Fig. 9 is a plan view, partially broken away for clarity, of the mechanism shown in Fig. 8.

While it is believed that the physical organization and operation of the exemplary embodiment of the invention will be clear from Fig. 1, it will be helpful to briefly describe the physical structure of a hydraulic controller organized as shown in Fig. 1. Referring first to Fig. 8, it will be seen that the flyweights 30 are pivotally connected at 29 to the valve casing 28. The casing 28 extends downwardly through a main housing 110 where its lower end 111 may receive the gear 27 which, as shown in Fig. 1, is driven from the shaft of the engine which is to be controlled. As the flyweights are positioned under the impetus of centrifugal force, they cause the compression or expansion of the spring S1 and raising or lowering of a plunger 32 having a land 35 thereon.

The chamber 56 shown in Fig. 1 also is clearly shown in Fig. 8, being formed within the housing 110 and containing the bellows 58 and the associated spring S4. As here shown, the link 59 connected with the bellows 58 is pivoted as at 60 to the floating lever 61 which connects at its one end to the plunger 64a of the valve 64 and at its other end to the plunger 78a of the amplifying valve 79. The various conduit connections to the valves 64 and 79 are labeled in Fig. 8 to correspond to the conduit connections illustrated schematically in Fig. 1.

As shown particularly in Figs. 4 and 5, the valve 64 is also preferably provided with a rotatable casing 64d which carries a gear 114 meshing with a gear 115 fast on the rotatable casing 28. In this fashion, a frictional resistance to axial shifting of the valve plunger 64a is minimized.

Figure 10:
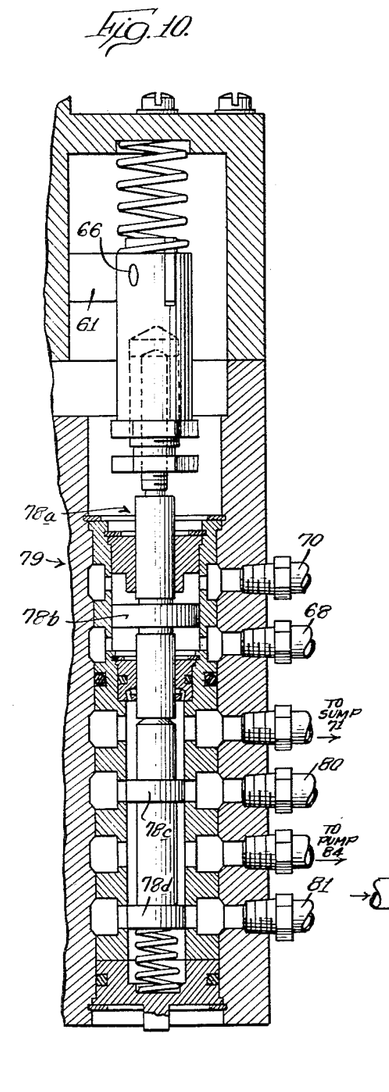
Figs. 10 and 11 are fragmentary sectional views taken substantially along the lines 10—10 and 11—11, respectively, in Fig. 9.

The hydraulic amplifier valve 79 which is shown in outline by Fig. 8 is more fully illustrated in section by Fig. 10. As there shown, the land 78b on the plunger 78a is slidably disposed in a casing between two ports which are connected respectively to the conduits 68 and 70 appearing in Fig. 1. Thus, the valve plunger 78a is moved up or down, as viewed in Fig. 10, when the relay valve plunger 64a is moved in one direction or the other by the link 59 connected to the bellows 58. The lands 78d and 78c for the plunger 78a are also clearly illustrated in Fig. 10. It will be apparent that the conduit connections shown in Fig. 10 are labeled to correspond to the connections schematically shown in Fig. 1.

Figure 11:
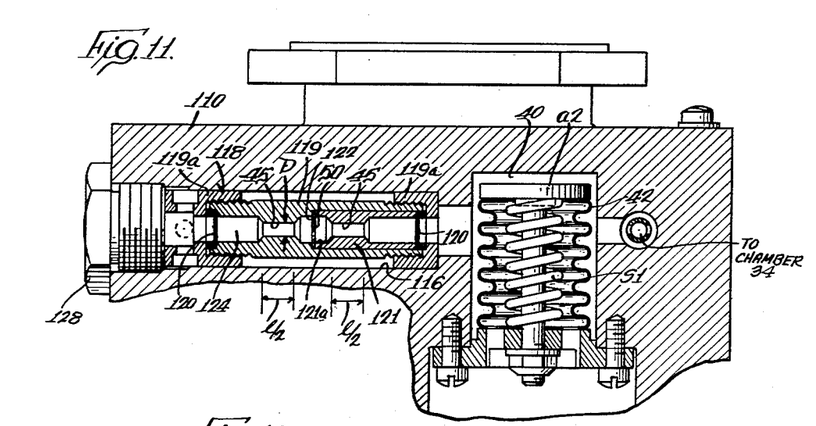

Of particular interest is the manner in which the orifices 45 and 50 are incorporated into the physical embodiment of the controller as shown in Fig. 11. For this purpose, the main body 110 is provided with a substantially cylindrical cavity 116 which receives a plug-shaped insert 118. The latter comprises a hollow body 119 having threaded caps 119a at either end which hold filtering screens 120 in place to prevent the entry of foreign matter into the central passage. At the right end of the body 119 as shown in Fig. 11, a plug-shaped insert 121 is held in place by the threaded cap 119a. This insert contains near its inner end a reduced diameter pipe-like orifice 45, and then widens to provide an enlarged recess 121a at its inner end. When the insert 121 is slipped into the body 119, it holds a relatively thin metal disc 122 in place, the latter having the small sharp-edged orifice 50 in the central portion thereof. The body 119 further includes a reduced diameter pipe-like orifice 45 in its left portion which widens out at 124 into a conduit of larger cross section.

By this provision, the orifice 45 is effectively divided into two parts which are disposed on opposite sides of the orifice 50. For example, each portion of the orifice 45 shown in Fig. 7 constitutes one-half of its total length, $l/2$, while its diameter is illustrated by the dimension D. The sharp-edge orifice 50 is surrounded on opposite sides by cavities or recesses of relatively large cross section so that the velocity of fluid flow approaching the orifice 50 is relatively low under all circumstances. This assures that the absquare pressure drop versus flow characteristic for the sharp-edged orifice is maintained.

With the orifice structure 118 in Fig. 11, it is but a simple matter to change orifice dimensions and thus change or adjust the constants of the controller. The entire assembly 118 in Fig. 7 may be removed from the body 110 simply by loosening the retaining threaded cap 123, after which a different body containing orifices of different sizes may be slipped into operative position. On the other hand, if it is desired to change only the dimensions and thus the constant for the sharp-edged orifice 50, then the cap 119a at the right end of the body 119 may be unscrewed, the insert 121 temporarily removed so that the disc 122 may be replaced with a different one having a sharp-edged orifice of a different size.

Figure 12:
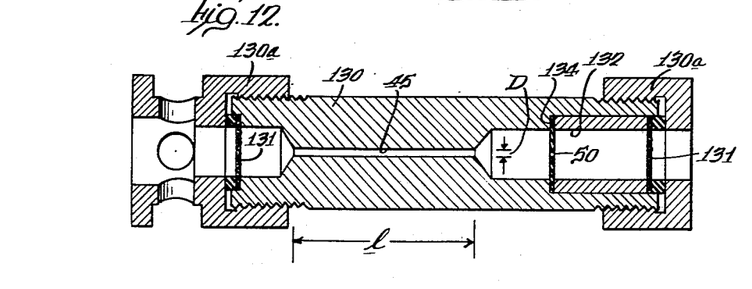
Fig. 12 is a sectional view of a modified orifice structure.

Figure 12 illustrates another form of physical orifice structure. As there shown, the pipe-like orifice 45 which has a linear flow characteristic of pressure drop versus flow, is constructed to be of one continuous length $l$ and of a selected diameter D bored through a body 130. The body 130 is threaded at either end to receive retaining caps 130a which hold filtering screens 131 in place, the cap 130a at the left also holding a cylindrical insert 132 in place. The latter retains a thin metal disc 134 firmly against a shoulder formed within the right end of the body 130, the diameter of the passage through the body on either side of the disc being relatively large as compared to the diameter D of the orifice 45. The thin plate 134 has centrally located therein a small orifice 50 which has the characteristic of pressure drops thereacross varying as the absquare of the fluid flow therethrough. It will be noted that the diameter of the passageway on either side of the orifice 50 is of relatively large diameter so that the velocity of fluid approach to the orifice 50 is relatively slow. This assures that the absquare pressure characteristic will be obtained under all conditions of operation.

Figure 13:
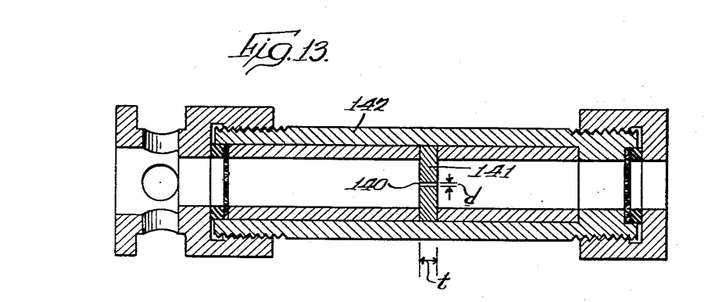
Fig. 13 is a sectional view of another modified orifice structure.

It has been found that in some instances a modified orifice means such as that shown in Fig. 13 may be used in place of the arrangement shown in Figs. 7 and 8. Referring to Fig. 13, it will be seen that a single small orifice 140 of diameter $d$ is bored through a moderately thick plate 141 having a thickness $t$ and disposed centrally within a hollow body 142. The diameter of the passage through the body 142 on either side of the plate 141 is relatively large compared to the diameter $d$. It has been found that an orifice in a plate having a finite and appreciable thickness $t$ will produce a pressure drop versus flow characteristic substantially like the combined characteristic of series-connected pipe-like and sharp-edged orifices.

Figure 14:
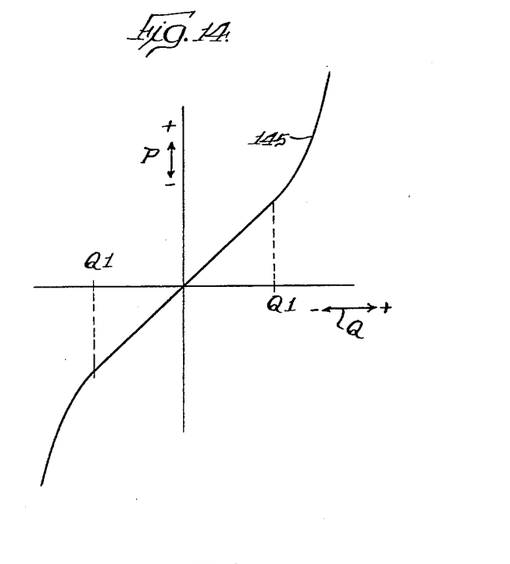
Fig. 14 is a graphic illustration of the pressure drop versus flow characteristic for the orifice structure of Fig. 13.

The characteristic pressure drop versus flow for the orifice 140 in Fig. 13 is illustrated by the curve 145 in Fig. 14. It will be seen that as the rate of fluid flow varies in either direction from zero over a relatively narrow range, the pressure drop across the orifice 140 changes with an almost perfectly linear relation. For when the pressure drop across the orifice 140 is low and the rate of fluid flow is relatively low, there is laminar flow therethrough so that the pressure drop and rate of flow are linearly related. However, as the rate of fluid flow through an orifice having significant thickness $t$, such as shown at 140 in Fig. 13, is increased so that it becomes turbulent flow or mixed laminar and turbulent flow, the relationship of the pressure drop to the rate of flow becomes non-linear and closely approaches a squared relationship. In other words, as the flow increases beyond those points marked $Q_1$ in Fig. 14, the pressure drop then increases substantially as the square of the rate of flow. Thus, the shape of the total characteristic 145 for the orifice 140 becomes substantially similar to the characteristic illustrated by the curve 100 in Fig. 11 and which represents the sum of the pressure drops across pipe-like and sharp-edged orifices. It has been found unnecessary to always employ both a sharp-edge and a pipe-like orifice (or ones having similar flow characteristics) in series since a single orifice of significant thickness will produce substantially the same results.

In the use of hydraulic controllers of the type previously described with reference to Fig. 1, two conditions must be guarded against. The first is the possibility that the characteristics of the controlled device, such as the aircraft engine 21 here illustrated by way of example, are not so changed that a higher loop gain is present which, without modification of the control system constants might result in instability and hunting. A second condition is the possibility of the orifices becoming clogged if for some reason foreign material such as dirt particles might get into the hydraulic fluid.

Consider, for example, the aircraft engine 21 schematically shown in Fig. 1. That engine with the throttle wide open has a certain inherent maximum acceleration or, in other words, the value of $\phi'$ is bounded. If a different and better fuel should be employed or if the engine were somehow modified to cause it to have an even greater maximum acceleration, then the damping coefficient shown above in the parenthesis of Equation 18 under some circumstances becomes so large that instability and cycling would result. Especially in the control of aircraft engines where safety is of utmost importance, it is necessary to prevent even this remote possibility.

And while filtering screens may be used in the hydraulic system as shown in Figs. 11 and 12, it is also desirable especially in the control of aircraft engines to completely eliminate the possibility of trouble if clogging should result.

Figure 15:
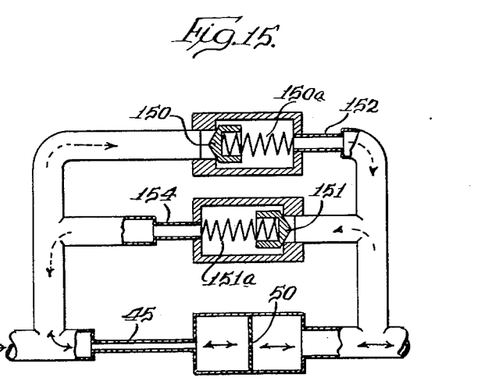
Fig. 15 is a schematic illustration of a modified orifice arrangement to produce changes in constants of control variables.

Referring now to Fig. 15, an arrangement is there shown which protects against both of these remote possibilities. The pipe-like orifice 45 which has a linear relation between the pressure drop thereacross and the flow therethrough, is shown connected in series with a sharp-edged orifice 50, which, as previously explained, has an absquare relation between the pressure drop thereacross and the rate of flow therethrough. If, however, the value of the rate of change of deviation, i.e., $\phi'$ as used in the foregoing equations, should increase to such a high value that the pressure drop across the two orifices 45, 50 (i.e., $p_2+p_3$ as used in the previous equations) should become excessive, then it will cause opening of one or the other of two check valves 150, 151. These two check valves are connected in parallel with the orifices 45, 50 and respectively in opposite directions so that they will open against the force of their biasing springs 150a, 151a and bypass fluid around the orifices 45, 50 if the pressure drop across the latter becomes excessive. This could occur, of course, if either the orifices 45 or 50 would become clogged or if the rate of deviation, i.e., $\phi'$ as used in the previous equations, should become excessive. The two check valves 150, 151 are each connected in series with restrictions or pipe-like orifices 152 and 154, respectively, which are of larger diameter and shorter length than the orifice 45. Therefore, if one of the check valves 150, 151 should open, a linear control will still be had but without the non-linear or the absquare term as reflected in Equation 17 above. Thus, if the acceleration of the engine 21 should become excessive or if one of the orifices 45, 50 should become clogged, the control system if modified as shown in Fig. 15 will automatically revert to a proportional and linear rate control action which will not have the speed of response of the unmodified system but which will result in safer control with little possibility of cycling or other instability.

Figure 16:
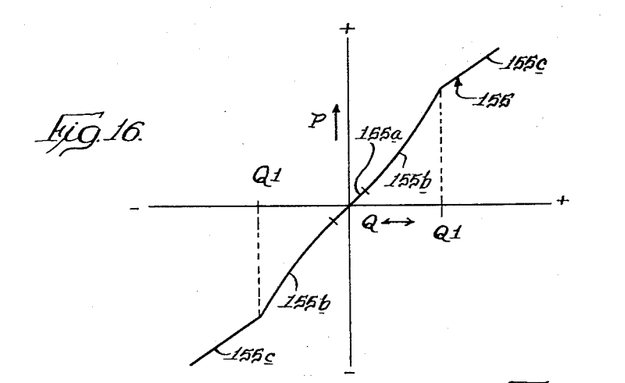
Fig. 16 is a graphic representation of the pressure drop versus flow characteristic for the arrangement shown in Fig. 15.

This result can be best understood with reference to Fig. 16 which shows by a curve 155 the relation between the pressure drop across the orifices 45, 50 when the latter are shunted by check valves and restrictions as shown in Fig. 15. It will be seen from Fig. 16 that the pressure response is substantially linear in the region of the origin as shown by the curve portion 155a. Moreover, as the rate of fluid flow increases further, the pressure drop becomes more non-linear with relation to the rate of fluid flow, as illustrated by the curve portions 155b, up to the values of fluid flow $Q_1$. Therefore, the curve 155 is substantially identical in its shape with the curve 100 in Fig. 6. However, in the event that the fluid flow should become excessive and exceed a predetermined value $Q_1$, due to the fact that the acceleration of the controlled engine becomes excessive, then one of the check valves 150 or 151 in Fig. 15 will open so that the pressure characteristic then becomes linear and has a lesser slope as illustrated by the curve portions 155c in Fig. 16. When the controller is operating over the curve portions 155c, therefore, the action will be substantially linear and there is little possibility of instability and cycling.

It is also especially important to guard against the possibility of changes in viscosity of hydraulic fluid with changes in ambient temperature which might possibly affect the pressure versus flow characteristics of the orifices and thus change the action of the control system. While there are available many hydraulic fluids which do not vary in viscosity appreciably over a wide range of temperatures, it is nevertheless important in the interest of extreme safety for the control of aircraft engines to prevent even a slight possibility of viscosity changes from changing the characteristics of the control system.

For a sharp-edged orifice having its pressure drop varying as the absquare of the flow therethrough, changes in viscosity of the fluid do not have an appreciable bearing on that characteristic. However, a linear pipe-like orifice or one which has a linear relation between the pressure drop thereacross and the fluid flow therethrough may have its pressure versus flow characteristic changed appreciably, i.e., the constant $c_3$ in the foregoing Equation 10 may change. In other words, as the ambient temperature of a hydraulic fluid decreases and its viscosity increases, the pressure drop across a linear pipe-like orifice may increase even though the rate of fluid flow therethrough remains substantially the same.

Figure 17:
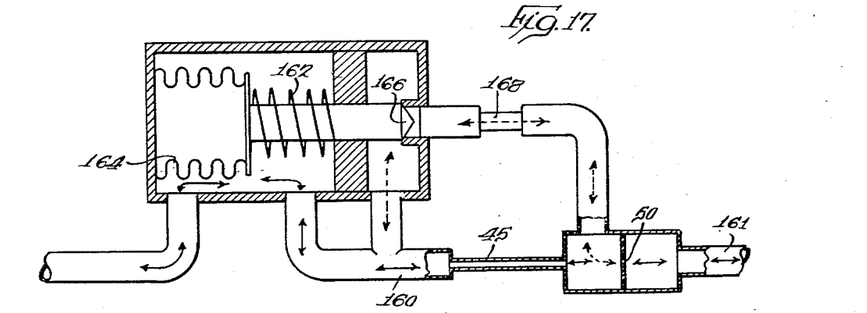
Fig. 17 is a schematic illustration of an orifice arrangement equipped with means for compensating for temperature changes so as to maintain the controller characteristics uniform over a wide range of ambient temperatures.

In order to obviate this difficulty, a suitable arrangement is schematically illustrated in Fig. 17. As there shown, a pipe-like orifice 45 is connected in series with a sharp-edged orifice 50 between conduits 160, 161. Fluid which flows through the orifices 45, 50 is passed first through a relatively large chamber 162 which contains a temperature sensitive bellows 164. As the temperature of the fluid within the system decreases, the bellows 164 will contract and permit a compression spring 165 to open a check valve 166 which is connected in parallel with the orifice 45. The parallel or shunting path around the orifice 45 not only includes the normally closed check valve 166, but also a restriction 168 which is larger in diameter and shorter in length than the orifice 45.

As a result, if the temperature of fluid in the system should decrease below a predetermined point, causing the viscosity of the fluid to increase to such an extent that the pressure drop across the orifice 45 would be unduly increased, the bellows 64 contracts to open the check valve 166. Thereafter, fluid flows principally through the restriction 168 instead of the orifice 45 and thence through the sharp-edged orifice 50. Thus, whenever the viscosity of fluid increases at low temperatures, causing the orifice 45 to act as if it had a smaller diameter, a bypass path is automatically created in parallel with the orifice 45, and the rate action of the system is held to a safe value.

We claim:

1. The method of controlling a variable condition to maintain it at a desired reference value comprising creating a first fluid pressure which varies in proportion to the deviation of said condition from said reference value, creating a fluid flow which is proportional to a time derivative of said deviation, deriving from said flow a second fluid pressure which varies in proportion to the absquare of said derivative, and correctively adjusting said condition in accordance with the algebraic sum of said first and second pressures.

2. The method of controlling a variable condition to maintain it at a desired reference value comprising creating a first fluid pressure which varies in proportion to the deviation of said condition from said reference value, creating a fluid flow which is proportional to a time derivative of said deviation, deriving from said flow a second fluid pressure which varies in proportion to said time derivative, and correctively adjusting said condition in accordance with the algebraic sum of said first and second pressures.

3. The method of controlling a variable condition to maintain it at a desired reference value comprising creating a first fluid pressure which varies in proportion to the deviation of said condition from said reference value, creating a fluid flow which varies in proportion to a time derivative of said deviation, deriving from said flow a second fluid pressure which varies in proportion to said time derivative, deriving from said flow a third pressure which varies in proportion to the absquare of said time derivative, and correctively adjusting said condition in accordance with the algebraic sum of said first, second and third pressures.

4. The method of maintaining a variable condition at a desired reference value comprising creating a first fluid pressure which varies in proportion to the deviation of said condition from said reference value, creating a fluid flow which varies in proportion to the first time derivative of said deviation, deriving from said flow a second fluid pressure which varies in proportion to said time derivative, deriving from said flow a third fluid pressure which varies as the absquare of said time derivative, creating a fourth fluid pressure which varies as the algebraic sum of said first, second and third pressures, displacing a movable element by amounts proportional to said fourth pressure, and correctively altering said condition at rates proportional to the displacement of said movable element.

5. In a control system for maintaining a variable condition at a desired reference value, the combination comprising energy-responsive means for changing the variable condition, means for creating a first hydraulic pressure which varies with the deviation of said condition from the reference value, means for causing the flow of hydraulic fluid at a rate substantially proportional to a time derivative of variations in said pressure, means for creating in response to said flow a second hydraulic pressure which varies with the absquare of said flow, and means for supplying energy to said energy-responsive means at a rate proportional to the changes in said second pressure.

6. In a controller for maintaining a variable condition at a desired reference value, the combination comprising energy-responsive means for adjusting the variable condition, means for creating in a chamber a first hydraulic pressure which changes substantially in proportion to the deviation of said condition from said reference value, means for causing the flow of hydraulic fluid over a path at a rate substantially proportional to a time derivative of the variations in said pressure, orifice means in said path for creating a pressure drop which varies substantially as the signed square of said flow, means for producing a second pressure which changes substantially in proportion to the algebraic sum of said first pressure and said pressure drop, and means for supplying energy to said energy-responsive means at a rate instantaneously related to the changes of said second pressure to restore the variable conditions to the reference value.

7. In a control system for maintaining a variable condition at a desired reference value, the combination of means for sensing deviations of the condition from the reference value and producing a first hydraulic pressure varying substantially proportionally with said deviations, means for producing a second hydraulic pressure which varies substantially with the absquare of a time derivative of deviations of said condition, means for producing a third pressure which changes as the algebraic sum of said first and second pressures, and means for correctively altering said variable condition in accordance with the changes of said third pressure.

8. In a control system for maintaining a variable condition at a desired reference value, the combination comprising means for producing in hydraulic fluid a first pressure which varies from a first reference pressure in proportion to the deviation of said condition from said reference value, means for producing in hydraulic fluid a second pressure which varies from a second reference pressure in proportion to the first time derivative of the deviation of said condition from said reference value, means for producing in hydraulic fluid a third pressure which varies from a third reference pressure in proportion to the absquare of the first time derivative of the deviation of said condition from said reference value, means for producing in hydraulic fluid a fourth pressure which varies from a fourth reference pressure as the algebraic sum of said first, second and third pressure variations, and means for correctively altering said variable condition in accordance with the value of said fourth pressure variations.

9. In a control system for maintaining a variable condition at a desired reference value, the combination comprising a first fluid chamber and means for creating pressure variations from a first reference pressure therein which are proportional to the deviation of said condition from said reference value, a second fluid chamber communicating with said first chamber and having a first member therein compressible in proportion to said pressure variations, a third fluid chamber having a second member therein movable in proportion to the pressure exerted thereon, orifice means connecting said second and third chambers, said orifice means having a pressure drop versus flow characteristic which is substantially linear for relatively low rates of flow therethrough and non-linear for relatively high rates of flow therethrough, and means for adjusting said variable condition in accordance with the movement of said second member.

10. The combination set forth in claim 9 further characterized in that said orifice means comprises a linear orifice connected in series with a sharp-edged orifice.

11. The combination set forth in claim 9 further characterized in that said orifice means comprises a pipe-like orifice having the pressure drop thereacross vary directly with the rate of fluid flow therethrough, and an enlarged diameter cavity bisected by a thin plate having a small central orifice therein in series with said pipe-like orifice, said small orifice having the pressure drop thereacross vary as the signed square of the fluid flow therethrough.

12. The combination set forth in claim 9 further characterized in that said orifice means comprises a small opening through a plate of sufficient thickness such that the pressure drop across said opening varies substantially directly with relatively low rates of fluid flow therethrough and varies substantially as the signed square of relatively high rates of fluid flow.

13. The combination set forth in claim 10 further characterized in that a normally closed fluid by-pass path is provided in parallel with one of said orifices, together with means for opening said path in response to the existence of a predetermined condition.

14. The combination set forth in claim 10 further characterized in that a normally closed fluid by-pass path is provided in parallel with the series-connected linear and sharp-edged orifices, together with means for opening said by-pass path whenever the pressure drop across said orifices exceeds a predetermined value, so that the control is more linear for large deviations of the variable condition.

15. The combination set forth in claim 10 further including a fluid by-pass path in parallel with said linear orifice, a normally closed valve in said path, and means for opening said valve as the temperature of fluid passing through said orifices decreases, so that increased viscosity of the fluid does not unduly affect the control action of the system.

16. In a system for maintaining a variable condition at a desired reference value, the combination comprising energy-responsive means for adjusting the value of said condition, a cylinder adapted to hold fluid under pressure and a piston movable therein, means for exerting a force on said piston which varies from a reference force with the deviation of said condition from said reference value and which thus creates corresponding variations in the pressure of the fluid in said cylinder, a first fluid chamber communicating with said cylinder and containing a first resilient bellows which is deflected in proportion to the pressure variations in said cylinder, a second fluid chamber containing a second resilient bellows which is deflected in accordance with the pressure therein, first and second series-connected orifices interconnecting said first and second chambers, said first orifice having the characteristic $p=c_3Q$ and said second orifice having the characteristic $p=c_2\{Q\}$ where $p$ is the pressure drop across the respective orifices, $Q$ is the fluid flow therethrough, $\{Q\}$ is the absquare of the fluid flow therethrough, and $c_3$ and and $c_2$ are constants, so that said second bellows is deflected in accordance with the algebraic sums of the pressure in said first chamber and the pressure drops across said orifices, and means for energizing said energy-responsive means in accordance with the deflection of said second bellows.

17. The method of creating a hydraulic variation proportional to the absquare of a time derivative of a variable condition, said method comprising changing the volume in a main body of substantially incompressible fluid in proportion to changes in the variable condition by causing fluid flow into or out of said body, and causing such flow to create a pressure drop across a sharp-edged orifice, so that the pressure drop varies as the absquare of the time derivative of the variable condition.

18. The method of creating a hydraulic pressure $p$ which varies as the absquare $\{\ \}$ of the first time derivative $\phi'$ of a variable condition $\phi$, said method comprising changing the volume $v$ in a main body of incompressible fluid in proportion to the variable condition so that $v=k_1\phi$ (where $k_1$ is a constant of proportionality) by causing fluid flow Q into or out of the main body, and causing such flow to pass through a restriction having the characteristic $p=c\{Q\}$ (where $p$=pressure drop across the restriction, $\{Q\}$ equals the absquare of flow therethrough, and $c$ is a constant).

19. The method of creating a hydraulic variation proportional to the absquare of the first time derivative of a variable condition, said method comprising changing the pressure within a main body of incompressible fluid in proportion to said variable condition, causing such pressure changes to create proportional changes in the volume of the main body by fluid flow into or out of such body, and passing such flow through an orifice having the characteristic $p=c\{Q\}$ (where $p$ is the pressure drop across the orifice, $\{Q\}$ is the absquare of the flow therethrough, and $c$ is a constant), so that the pressure drop $p$ is the first-named hydraulic variation.

20. Apparatus for producing a hydraulic pressure variation proportional to the absquare of the first time derivative of the deviation of a variable condition from a reference value comprising, in combination, a fluid chamber, means for varying the volume of said chamber in proportion to said deviations, and an orifice communicating with said chamber and through which fluid flows as the volume of chamber changes, said orifice having the characteristic $p=k\{Q\}$ where $p$ is the pressure drop across the orifice, $\{Q\}$ is the absquare of the rate of fluid flow through the orifice, and $k$ is a constant, whereby the pressure drop across said orifice varies as the absquare of the first time derivative of said deviations.

21. Apparatus for producing a hydraulic pressure variation proportional to the absquare of the first time derivative of the deviations of a variable condition from a reference value comprising, in combination, a fluid chamber, means for varying the pressure of fluid within said chamber in proportion to said deviations, a resilient, compressible bellows within said chamber which is expanded or contracted in proportion to the variations of pressure in said chamber to proportionally change the volume of the latter, and a sharp-edged orifice communicating with said chamber and through which fluid flows as the volume of the chamber changes, whereby the pressure drop across said orifice varies as the absquare of the first derivative of said deviation.

References Cited in the file of this patent
UNITED STATES PATENTS

| | | |
|---|---|---|
| 2,303,752 | Meredith | Dec. 1, 1942 |
| 2,647,493 | Whitehead et al. | Aug. 4, 1953 |
| 2,669,973 | Parker | Feb. 23, 1954 |